United States Patent [19]

Rivers

[11] 4,034,407
[45] July 5, 1977

[54] SCAN INTERLOCK SYSTEM

[75] Inventor: Roy W. Rivers, Farmington, N.Y.

[73] Assignee: Xerox Corporation, Stamford, Conn.

[22] Filed: Feb. 17, 1976

[21] Appl. No.: 658,442

[52] U.S. Cl. ............................................. 358/267
[51] Int. Cl.² ...................................... H04N 1/36
[58] Field of Search ................ 178/69.5 F; 358/267

[56] References Cited
UNITED STATES PATENTS 3,472,961 10/1969 Wheeler et al. ................ 178/69.5 F
3,506,785 4/1970 Harris, Jr. ....................... 178/69.5 F

*Primary Examiner*—Robert L. Richardson

[57] ABSTRACT

In a facsimile communication system transmitting a signal sequence indicative of a scan-by-scan reading of a document, the improvement including a scan interlock control system for matching the scan pitch rate in the receiver with the scan pitch rate in the transmitter. During each scan, the transmitter provides a scan synchronization pulse which is compared for coincidence with a receiver scan synchronization pulse. If a mismatch is found, the minimum bit width in a receiver scan counter is altered by a variable length counter towards a matching direction. The adjusted scan counter then provides the serial bits of data which, through a D/A converter, control the scanning mechanism in the receiver.

9 Claims, 3 Drawing Figures

SCAN INTERLOCK SYSTEM

BACKGROUND OF THE INVENTION

1. Field of the Invention

The present invention relates to facsimile communication systems, and more particularly to improvements in the scan interlock circuits thereof.

2. Description of the Prior Art

Transmission of graphic information over large distances is often done by way of telephone networks. Most often such transmission occurs between two transceivers coupled to each end of an established network branch, one transceiver impressing a signal onto the line which is picked up by the other transceiver. The impressed signal typically represents, in electrical equivalent, the local reflectivity of the medium containing the graphical information.

Most often, the medium takes the form of a printed page which is scanned for reflectivity in a line-by-line scan pitch and which at the receiving end provides a control signal for an automatic graphic device. The graphic device, in coherent scan pitch relationship, then duplicates the image.

One such prior system has been described in the U.S. application Ser. No. 391,696, filed Aug. 27, 1973, by Perrault et al, now U.S. Pat. No. 3,914,538, and assigned to the same assignee as the instant application. In the above application, the transmission of facsimile signals is first preceded by a signal group which synchronizes the receiving scan pitch with the transmitting device, equalizes signal intensity at both ends and generally sets up the receiver for regeneration of the graphic image.

In the above context, it is necessary to note that the designation of a receiver or transmitter is purely functional. Generally, the devices at both ends of the line operate as transceivers and are therefore characterized herein according to the mode of operation only.

In the above-referenced application, the scanning of the document or medium is performed by way of a laser beam, the reflection thereof being converted into a video signal. The beam is scanned across the document by an oscillatingly driven mirror and a single photodetector provides the conversion of the beam reflection into an analog signal which varies in intensity with the intensity of the reflected beam. On the receiving end, an autonomous sweep generator provides a deflection signal which, in a similar manner, sweeps a laser beam across a xerographic surface. The sweep or deflection signals in the transmitter and receiver are essentially autonomous. Any small variations in sweep rate or sweep angle quickly show up as a loss of fidelity in the reproduced image.

For this reason, most autonomously scanned systems, including the above-referenced system, require at least a periodic interlock between the transmitter and receiver scanning devices.

SUMMARY OF THE INVENTION

Accordingly, it is the general purpose and object of the present invention to provide an improved scan compensation and interlock circuit, operative in the receiver mode, for synchronizing the transmitter and receiver scan sweeps.

Other objects of the invention are to provide a control circuit in the receiver stage of a facsimile device which periodically controls the receiver scan sweep in response to scan timing signals from the transmitter.

Yet further objects of the invention are to provide apparatus for resetting the scan time base of a facsimile receiver when an asynchronous condition occurs between the receiver and transmitter time bases.

Briefly, these and other objects are accomplished within the present invention by providing a facsimile transceiver system adapted to communicate with other transceivers across a voice quality transmission medium such as a telephone network, wherein the signals from one transceiver are compressed and carried as frequency modulations and vestigal sideband transmissions to the other transceiver. To correlate the scan pitch in the sending transceiver with the receiving transceiver, there is a framing control or scan interlock system incorporated in both which is rendered active in the receiving mode. The transmitting transceiver, during each scan, transmits a scan timing pulse which is compared in the scan interlock system against a preset aperture and if an error is found, the interlock system adds or subtracts an appropriate number of sub-bits from a serial bit count which, in turn, controls the scan rate in the receiving transceiver.

For purposes herein, it is contemplated that both transceivers be identically constructed, each including such an interlock control system which is only activated in the transceiver operating in the receiving mode.

To further expound on the description herein, the scan interlock system in the transceiver includes a crystal oscillator which through a clock counter provides a clock signal. This bit serial clock signal is connected to a counter series each forming a divide-by stage and designated herein as a controlled, variable length counter in series with a fixed length counter. One of the higher bit position of this fixed length counter is brought out as one input to a coincidence detector, clocked by one of the sub-bits, from the variable length counter to compare the coincidence of this event, within this less significant pulse duration, with the transmitted scan timing pulse. The coincidence detector then produces a three-state signal indicating a late, matching or early coincidence which in turn controls the count length of the variable length counter.

DESCRIPTION OF THE SPECIFIC EMBODIMENT

While the following description of the framing control or scan interlock system is in context with a facsimile communication system, such is for purposes of illustration only. It is to be understood that various other uses therefor will be obvious to those skilled in the art, and no intent to limit the scope of the invention is expressed by the choice of the example herein.

Figure 1:
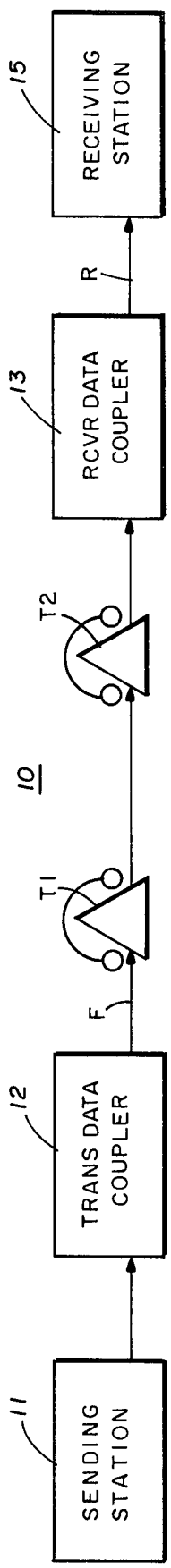
FIG. 1 is a generalized block diagram of a system incorporating the invention herein.

As shown in FIG. 1, a facsimile communication system, generally designated by the numeral 10, comprises a sending station 11 which, through a transmitting data coupler 12, applies a coded facsimile signal F onto a telephone network comprising the telephones $T_1$ and $T_2$ at either end thereof. Telephone $T_1$ is therefore the transmitting telephone, the transmitted data being picked up at telephone $T_2$ by a receiving data coupler 13. Data coupler 13 then generates a receiver signal R to a receiving station 15.

In the interest of completeness, both the sending station 11 and receiving station 15 include recognition logic, not pertinent herein, whereby back and forth data transfer occurs to assure an established telephone network, signal amplitude matching or equalization and other functions necessary to prepare both stations for facsimile transmission. For the details of these functions, reference should be had to the aforementioned application wherein the above functions are taken up in detail.

Figure 2:
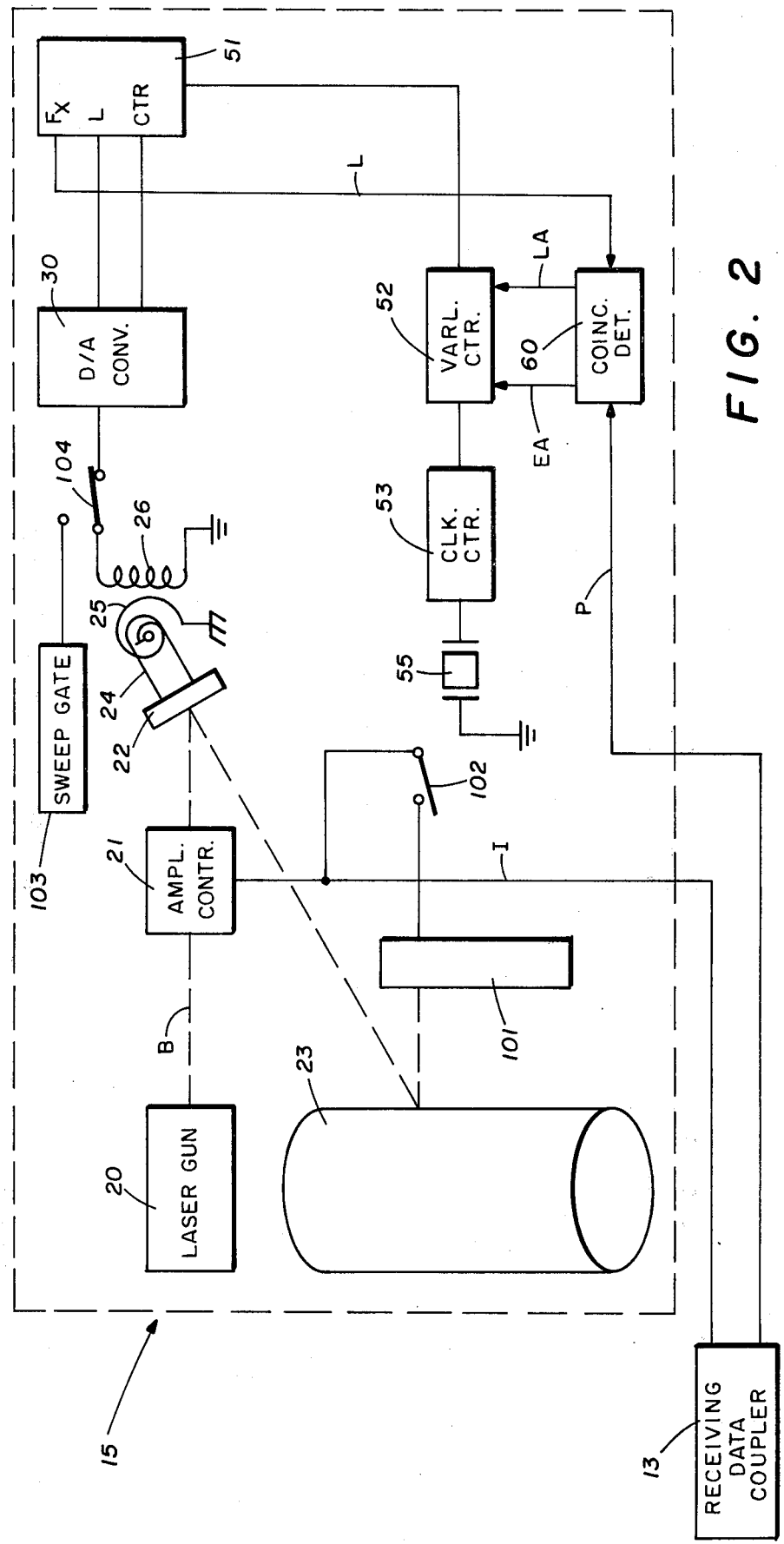
FIG. 2 is a more detailed block diagram of a receiver segment of FIG. 1.

By reference to FIG. 2, the receiving station 15 includes a laser gun 20 which emits a beam B to an amplitude control circuit 21 which, by way of pulse duration control, modulates the amplitude of signal B according to an intensity control signal I generated by the receiving data coupler 13. At the output the amplitude control circuit 21 produces a modulated beam M which is directed towards an oscillatingly rotated mirror 22 to be reflected therefrom onto a xerographic drum 23.

The rotation of mirror 22 is achieved by way of a galvanometer movement comprising a pivoted mount 24 spring biased to one position by a spring 25 and displaced from that position by the signal impressed onto a coil 26. Coil 26, in turn, is excited by the signal output of a digital-to-analog (D/A) converter 30 which forms the basic scan sweep circuit of the system herein. D/A converter 30, in turn, converts, in a conventional manner, the serial output of a fixed length scan pitch counter 51 which is controlled according to the invention herein. More specifically, counter 51 is configured to increment the output of a variable length counter 52 which, in turn, counts up the output of a clock counter 53. Counter 53 acts as a divide-by counter reducing the oscillations from a crystal osciallator 55 to a working pulse rate or clock rate.

Variable counter 52, according to means to be described, is controlled in its count length by a coincidence detector circuit 60 which compares, within a least significant count bit, the coincidence between a local sync signal L and a received sync signal P provided periodically by the data coupler 13.

For purposes herein coupler 13 provides the requisite circuitry for sync stripping of the various signals serially interspaced with the video or facsimile signal, and therefore provides functions which go beyond the normal functions of a data coupler. Accordingly, reference once more is invited to the aforementioned allowed application, wherein the various functions now set forth are treated at length and in detail.

Again, in the interest of completeness, it is to be noted that receiving station 15 is designated as such only as result of its mode of operation. When operating as a transmitter, a strip photodetector 101 is selectively positioned to respond to the local reflectivity of drum 23 which in this mode is configured to support a document for scanning. Detector 101, through a mode selector switch 102, then provides the modulation signal to the amplitude control circuit 21 for transmission while a sweep generator 103 controls the winding 26 across a corresponding selector switch 104.

Thus, in the transmitting mode the scan sweep of mirror 22 is controlled by the sweep generator 103 and to insure proper scanning interlock at the receiving end means are necessary to match up this scan sweep with the receiver scan. Such an interlock is achieved by way of counters 51 and 52 and detector 60 as described herein.

Figure 3:
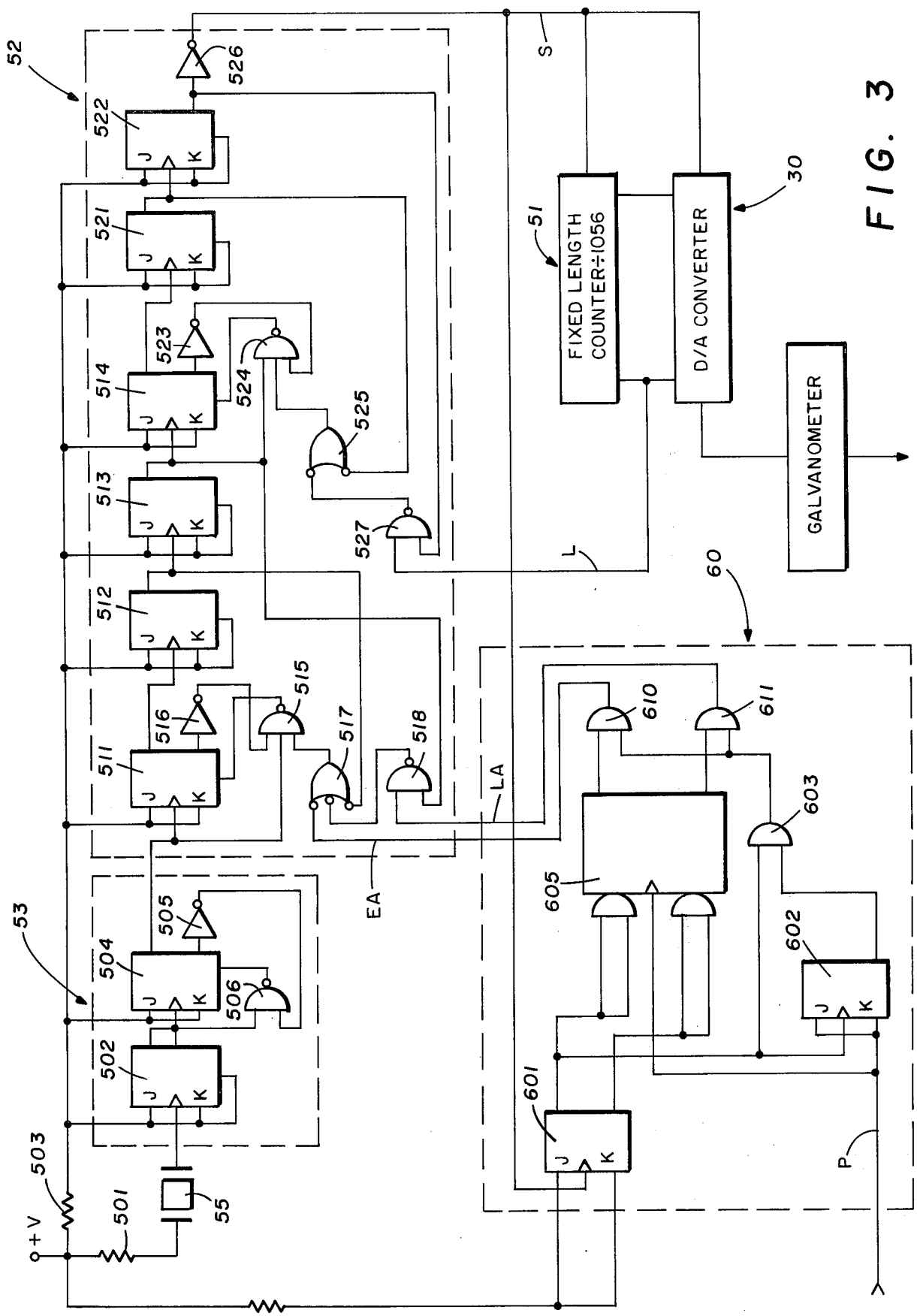
FIG. 3 is a circuit schematic illustrating the inventive scan interlock system as utilized in FIG. 2.

For the details of the above-mentioned interlock system, or the scan compensation system, reference should now be made to FIG. 3. As shown in this Figure, oscillator 55 is connected across a resistor 501 to a signal source +V for excitation. The output signal of oscillator 55 is, in turn, connected to the clocking terminal of a J-K flip-flop 502 which forms the first stage of counter 53. Flip-flop 502 is connected to a logical 1 or high at the J, K and clear terminals thereof, by way of a resistor 503 again connecting to the +V signal source. In this form, flip-flop 502 is configured to the conventional divide-by arrangement driving by its Q output the clock input of yet another J-K flip-flop 504 which also is pulled up at the J and K terminals to the logical 1. The $\overline{Q}$ output of flip-flop 504 is fed back through an inverter 505 to be collected with the Q output of flip-flop 502 at the inputs of a NAND gate 506 which clears flip-flop 504. In this manner, a divide-by counter is arranged reducing the output of oscillator 55 down to a working frequency. It should be noted that other levels of frequency factoring may be utilized herein and various known expansion techniques are fully compatible for this purpose.

The Q output of flip-flop 504 provides the above-mentioned working frequency clock input to the variable length counter 52. Counter 52 is again configured as a shift register-counter including four J-K flip-flops 511–514, all commonly pulled up at the J and K terminals to the +V signal. More specifically, the Q output of flip-flop 504 is both connected to the clock input of flip-flop 511 and to one input of a NAND gate 515 which at its other inputs receives the Q output of flip-flop 511, inverted by an inverter 516, and the output of an OR gate 517. Gate 517 includes all inverting inputs at the front thereof, collecting the Q output of flip-flop 512, the output of a NAND gate 518 and a signal EA from the coincidence detector 60. Concurrently, the Q output of flip-flop 511 drives the clock input of flip-flop 512 which by its Q output drives flip-flop 513. The Q output of flip-flop 513 is both connected to clock flip-flop 514 and as one input to gate 518. The other input to gate 518 is a signal LA, again developed in the coincidence detector 60.

In this form, flip-flops 511–513 provide a variable length counter, either counting up to four on receipt of signal EA or up to six on receipt of signal LA. In the absence of either of these signals a count of five is achieved. Flip-flop 514 forms the first stage of a fixed factoring counter stage which factors this variable count by some fixed ratio. For the purposes herein, a factor of three was found useful and accordingly two more series connected flip-flops 521 and 522, pulled up at the J, K and clear terminals, are included in counter 52. To provide this factoring the Q output of flip-flop 513 and the $\overline{Q}$ output of flip-flop 514, inverted by an inverter 523, are collected at a NAND gate 524. The other input to gate 524 is the output of an OR gate 525 which at one inverting input receives the Q output of flip-flop 521 and at the other inverting input receives the output of yet another NAND gate 527. Gate 527 collects the Q output of flip-flop 522 with the signal L. The $\overline{Q}$ output of flip-flop 522 is, furthermore, inverted by an inverter 526 to provide a count base signal S. This signal S is applied as the pulse signal to the fixed length counter 51 which herein is a divide-by 1056 counter driving the D/A converter 30. A selected more significant pit position of counter 51 is pulled off to provide the aforementioned signal L.

The above-described signal S is brought out to the coincidence detector 60 to clock a divide-by-two configured J-K flip-flop 601 thereat. Flip-flop 601, by its Q output, clocks yet another flip-flop 602 which is set to toggle by connecting the J and K inputs thereof to the received sync signal P. The $\overline{Q}$ output of flip-flop 602 is collected with the Q output of flip-flop 601 in an AND gate 603. Concurrently, the Q and $\overline{Q}$ outputs of flip-flop 601 are connected to the corresponding phase inputs of a phase detector latch 605 which is connected to discriminate at the leading edge of signal P. The Q and $\overline{Q}$ outputs of latch 605 are collected with the output of gate 603 at the corresponding inputs of two NAND gates 610 and 611 which respectively provide the EA and LA signals to counter 52.

In this manner, the coincidence between the leading edges of signals P and S is determined by the interlock of flip-flop 602 and latch 605. In case of no coincidence, the direction of lag or lead is determined by the relationship of latch 605 and flip-flop 602. Thus by sending a timing pulse in each scan cycle a scan interlock is formed which will correct out small errors in the receiver by appropriately adjusting a sub-count, increasing or decreasing the length of the basic clock pulse to a fixed counter which controls the sweep rate.

Obviously, many modifications and variations may be made with respect to the foregoing detailed description withoug departing from the spirit of the invention.

What is claimed is:

1. A scan interlock system adapted to control the scan rate of a receiver with that of a transmitter, comprising:
   a fixed length counter disposed in said receiver for controlling the scan deflection therein according to the bit output thereof;
   timing signal generating means disposed in said transmitter for providing a timing pulse concurrent with each scan;
   coincidence detecting means disposed in said receiver connected to receive a selected one of said bit outputs in said fixed length counter and said timing pulse for alternatively producing a first and second control signal corresponding to the lead or lag relationship between said selected one bit and said timing pulse;
   a clock disposed in said receiver for generating a clock signal; and
   a variable length counter disposed in said receiver and connected to receive said first and second control signals and said clock signal for producing a count signal to said fixed length counter at a first or second factor of said clock signal corresponding to the presence of said first or second control signals.

2. Apparatus according to claim 1 wherein said coincidence detecting means includes a coincidence detecting flip-flop strobed by said timing signal and gated by said count signal, a polarity detector gated between two output states by said count signal and strobed by said timing signal and gate means connected to receive a selected output from said coincidence detecting flip-flop and said polarity detector for enabling said first or second control signals when said coincidence detecting flip-flop and said polarity detector are in complementary states.

3. Apparatus according to claim 2 wherein said clock includes a crystal oscillator having the output thereof connected to a binary factoring counter, whereby the highest bit of said factoring counter provides said clock signal.

4. Apparatus according to claim 3 further comprising digital-to-analog converting means connected to the outputs of said fixed length counter for producing an analog signal corresponding in amplitude to the deflection of said scan.

5. A scanning interlock system comprising:
   scanning means adapted for deflection according to the amplitude of a scan sweep signal;
   a binary counter configured as a shift register of a predetermined count length;
   a digital-to-analog converter connected to receive the serial outputs from said binary counter to produce said scan sweep signal according to the code thereon;
   a source of reference scan sweeps;
   a source of scan timing signals for producing a scan timing pulse at a predetermined point of said reference scan sweeps;
   a variable length clock counter connected to advance said binary counter at varying intervals of time in response to a first and second control signal; and
   a coincidence detector adapted to receive a selected one parallel output from said binary counter and said timing signal for producing said first or second control signal according to the time relationship between said one parallel output and said timing signals.

6. Apparatus according to claim 5 wherein said variable length clock counter includes a crystal oscillator, a first fixed factoring counter stage dividing down the sequel from said oscillator, a variable factoring counter stage connected in series with said first stage for dividing down the output of said first factoring stage by a variable factor dependent on the presence of said first and second control signals, and a second fixed factoring counter stage connected in series with said variable factoring stage for dividing down the output of said variable factoring counter stage by a predetermined ratio.

7. Apparatus according to claim 6 wherein said variable factoring stage includes a divide-by-four, divide-by-five and divide-by-six factor according to the presence of said first or second control signal.

8. Apparatus according to claim 7 wherein said second fixed factoring counter stage includes a divide-by-three factor.

9. Apparatus according to claim 6 wherein said coincidence detector includes a coincidence detecting flip-flop strobed by said timing signal and gated by the output signal of said second stage factoring counter, a phase polarity detector strobed by said timing signal and gated by said second factoring stage output signal, and gating means for logically combining the outputs from said flip-flop and coincidence detector to produce said first and second control signal.

* * * * *